United States Patent [19]

Seppala et al.

[11] 4,378,220
[45] Mar. 29, 1983

[54] APPARATUS FOR AND METHOD OF COUPLING SHAFTS

[75] Inventors: Earl E. Seppala, New Castle; Howard J. Kutsch, Wilmington, both of Del.

[73] Assignee: E. I. Du Pont de Nemours and Company, Wilmington, Del.

[21] Appl. No.: 157,513

[22] Filed: Jun. 9, 1980

[51] Int. Cl.³ .............................................. F16D 3/58
[52] U.S. Cl. ........................................ 464/55; 464/87
[58] Field of Search ............... 64/12, 24, 25, 27 C, 64/27 NM; 464/55, 87

[56] References Cited

U.S. PATENT DOCUMENTS

| | | | |
|---|---|---|---|
| 643,081 | 2/1900 | Bullock | 64/12 |
| 653,102 | 7/1900 | Lieb | 64/27 NM X |
| 2,005,655 | 6/1935 | Havill | 64/27 C |
| 2,096,999 | 10/1937 | Sarazin | 64/24 |
| 2,549,751 | 4/1951 | Spengler | 64/25 |
| 2,858,855 | 11/1958 | Picanol | 64/12 X |
| 3,043,164 | 7/1962 | Sundt | 64/12 X |
| 3,301,010 | 1/1967 | Vernick | 64/24 |
| 3,877,259 | 4/1975 | Bishop | 64/27 NM X |
| 4,203,303 | 5/1980 | Miller | 64/12 |
| 4,252,226 | 2/1981 | Staub, Jr. | 192/106.1 |
| 4,252,227 | 2/1981 | Staub, Jr. | 64/27 NM X |
| 4,266,409 | 5/1981 | Kotsch | 64/12 |
| 4,291,790 | 9/1981 | Staub, Jr. | 64/27 NM X |
| 4,296,854 | 10/1981 | Staub, Jr. | 64/27 NM X |
| 4,300,363 | 11/1981 | Mathues | 64/27 NM |
| 4,300,670 | 11/1981 | Mathues | 464/55 X |

*Primary Examiner*—Tony M. Argenbright

[57] ABSTRACT

An apparatus is provided for transferring torque from one shaft to another. The shafts (11) and (12) are coupled together using a flexible member, such as an elastomeric spring or belt (23), trained around pins (21) eccentrically mounted on at least two planet gears (19). A sun gear (15) which is connected to one of the shafts (11) meshes with the planet gears. These gears (19) are also connected to the other shaft, (12), either through a ring gear (66) or pivots (27). When one of the shafts is rotated, this causes the planet gears (19) to rotate, and this rotation moves the pins (21) in an arc. This gradual controlled movement of the pins (21) causes the belt (23) to stretch in a manner so that as torque is transferred from one shaft to the other, troublesome torsional vibrations are effectively damped.

This energy-absorbing, torque cushioning apparatus is particularly suited for use as a lock-up clutch in motor vehicles.

25 Claims, 13 Drawing Figures

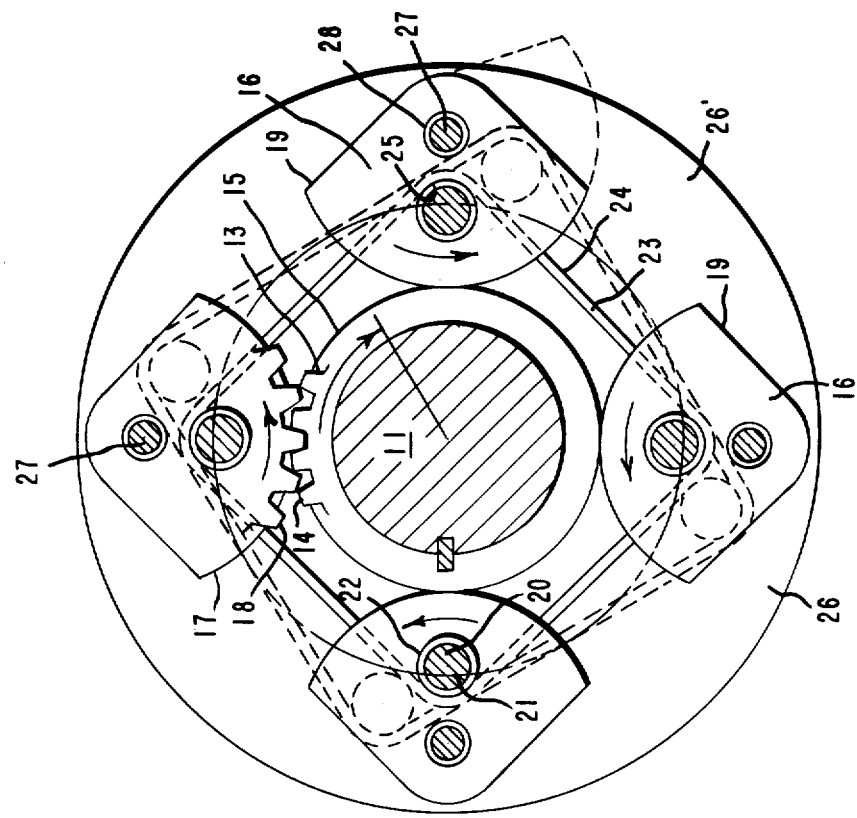
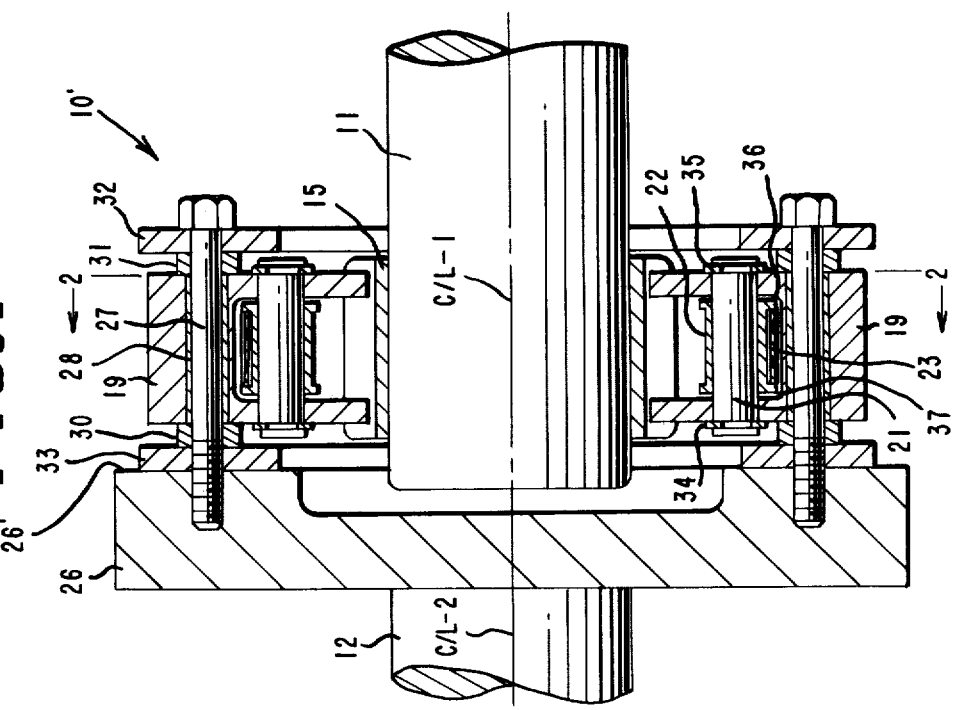

APPARATUS FOR AND METHOD OF COUPLING SHAFTS

TECHNICAL FIELD

This invention is an apparatus for and a method of transferring torque in which pins mounted eccentrically on planet gears are rotated in an arc to change the length of a flexible member (i.e., an elastomeric belt or straps or a compression spring) trained about or connected to such pins so that torque is transferred from a first shaft to a second shaft, both of which are connected to such gears. The planet gears may be pivotally connected to the second shaft or they may be free-floating and mesh with a ring gear operatively connected to the second shaft; a sun gear, which is part of or is connected to the first shaft, also meshes with the planet gears. Either shaft may be driven to rotate the planet gears and move the pins thereon so as to stretch the belt or place sufficient compression in the spring to bring about the torque transfer. The controlled arcuate movement of these pins enables this torque transfer to be gradual and by coupling the shafts together indirectly with the flexible member which interconnects these pins, improved cushioning and damping of vibrations is accomplished. The apparatus is particularly useful as a torque transfer device in that it provides a shock-absorbing lock-up of end-to-end shafts while damping the transmitted energy forces between such shafts.

BACKGROUND ART

It is known, in the prior art, to use various types of couplings to connect an input shaft to an output shaft to supply power from a prime mover to a load. Frequently the shafts are "locked" together in a manner such that torsional vibrations or shocks on either the input or output shaft are transmitted to the other shaft, many times with amplification, as well as to other parts of the apparatus. These vibrations or shocks may be caused by power surges, misfires and from sudden changes in demand load.

In the acceleration and deceleration of a given load, for example, short-term discontinuities of the energy flow, including reverse direction flow, may occur and this may result in such objectionable conditions as bumps or jerks or even cause harm to the equipment or stalling of the prime mover. This is particularly true in systems where a constantly or already running prime mover picks up a load when a clutch in the power train is actuated. Turning on an automobile air conditioner, for example, clutches in a heavy load, the compressor, in an already running power train which may be at a great variety of power conditions. Similarly "locking up" the torque convertor of an automatic transmission when cruising conditions are attained is a situation where load and input may be momentarily mismatched depending on the amount of hydraulic slip at the instant of engagement. In all of these systems, and others, troublesome vibrations or shocks may occur and with them inherent problems in the operation of such systems.

It, accordingly, is desirable to provide lock-up shafts with a cushioning device so that torsional vibrations or shocks are largely absorbed and not substantially transmitted from one shaft to the other. For example, in automotive vehicles that make use of an automatic transmission it may be desirable to include a lock-up clutch to couple the engine drive shaft directly to the transmission input shaft when the vehicle reaches a certain speed. Its purpose is to eliminate fuel losses related to torque converter slip. The shocks ordinarily occur during lock-up. Further, if the shafts are rigidly locked by this clutch, torsional vibrations or shocks on either shaft are transmitted to the other, as well as to the rest of the vehicle and its occupants. A torque cushioning device in series with the clutch is therefore desirable. Such a torque cushion must handle full engine torque, and any fractional part thereof, plus and minus the torsional vibrations derived from cyclic engine firing and other changes in demand load by the wheels. The softer the cushion the lower will be its natural frequency, and the better it will be for shock and vibration damping.

It, therefore, has become standard practice in the prior art, to incorporate some form of cushioning coupling in shaft lock-up systems to take up the initial load and to damp out bumps in operation. As an example, compression springs have been used for the torque cushioning portion of a lock-up clutch in an automotive vehicle, but their very presence, i.e., the space they occupy, plus their necessary loading elements, severely limits the amount of differential rotation permitted between the two shafts. Such systems are hard cushions with correspondingly high natural frequencies of vibration and, therefore, they perform poorly in response to sudden power surges and do little toward the damping of external vibrations. The basic problem remained unsolved.

As a further solution to this problem, it has been suggested, in the prior art, to use flexible couplings to connect the shafts together. In one approach, pins or rollers connected to one shaft are rotated in a circle inside a preformed noncircular flexible member connected to the other shaft to transfer torque; in another widely used approach pins connected to one shaft are moved relative to another shaft to stretch a flexible belt trained about the pins to couple the shafts, and to transfer torque from one shaft to the other. Typically in this latter coupling there are two sets of pins, one set is connected to a disc connected to one shaft and the other set to a disc connected to the other shaft, so that rotation of either shaft moves the pins connected to that shaft relative to the pins on the other shaft to place the required tension on the flexible belt to transfer torque to the other shaft. Prior to this invention, however, the art had not suggested the mounting of these pins eccentrically on planet gears which when rotated would move the pins in an arc toward or away from the shaft centerlines to place the required compression or tension on a flexible member (belt or spring) interconnecting such pins to transfer torque between shafts.

A typical coupling device or torque transmitter using a flexible belt trained about pins or rollers connected to two shafts is shown in copending U.S. patent application Ser. No. 013,193, filed Feb. 16, 1979 now U.S. Pat. No. 4,266,408. Such device essentially comprises a hub member and rim member, one of which is connected to an output shaft, and the other to an input shaft. The hub member has at least two hub rollers mounted on it, and the rim member, of larger diameter, is provided with a plurality of rim rollers. The hub and rim members are operatively connected by a flexible belt of an oriented copolyetherester elastomer trained over hub and rim rollers. This belt is capable of being stretched by up to about 60% of its original length upon application of force to either shaft to permit relative rotation of the hub member with respect to the rim member so that torque is transferred from one shaft to the other through such belt.

In this device, the rollers are fixed to the hub member and to the rim member and do not move radially with respect to the shaft centerlines; instead the belt is stretched by the circular movement of the rollers on one disc relative to the rollers on the other disc. While this is an effective way to transfer torque, it, nonetheless, places great stress on the belt, primarily due to the high degree of wrap as the belt is trained around the rollers on the hub member and rim member, which preferably are positioned so as to form modified triangular arrangements in their neutral or at rest positions. This motion, in time, tends to limit belt life due to reverse bending which can cause premature delaminations of the belt layers; additionally the requirement that the rollers be placed on both discs requires greater working space and this places spatial and rotatioal limits on the use of such coupling.

Another typical coupling for shafts using two sets of pins is shown in U.S. Pat. No. 643,081 to Bullock, patented Feb. 6, 1900. In this coupling, one shaft is rigidly secured to a first disc and the other shaft to a second disc and each of these discs has pins mounted thereon about which a flexible belt is trained. The pins on one of the discs are manually adjustable radially in the disc in a manner so as to tighten the belt or vary the tension thereof because in practice it would be inconvenient to place the belt upon the pins so as to be sufficiently taut for use. The radial adjustment is provided to give the belt the required initial tension after it has been placed on such pins. This is accomplished by rotating the pins in a large aperture in the disc, one way or the other, with the result of moving their projecting ends radially inward or away from the adjacent pins on the other disc, to take up the slack in the belt in an obvious manner. The pins are then locked in place using screws which pass through the heads of the pins to lock such pins from rotation.

A shaft coupler of the prior art using a preformed flexible member is shown in U.S. Pat. No. 3,877,259 to Bishop. In this device for coupling a drive shaft and a driven shaft, a polygonally shaped or noncircular coupling element in the form of a plurality of yieldable beam member is used. Such element is adapted to be supported by and to rotate with the driven shaft. The inner surfaces of the yieldable beam members define a noncircular opening for accommodating a plurality of rotary coupling members, as for example a plurality of rollers. These rollers revolve as a unit with and about the axis of the drive shaft and are maintained in engagement with the inner surface area of the yieldable beam members whereby flexibly to couple the shafts together and drive the driven shaft. In this device the rollers which create the necessary forces in the yieldable members to drive the driven shaft rotate in a circular path around the centerline of the end-to-end shafts; they do not move radially with respect to such shaft.

A problem with the above teachings, and with the other known art, is that there is no suggestion of a relatively simple way to change the length of a flexible belt or spring, by moving a single set of pins to which the belt is connected relative to the centerlines of the shafts; that is, in a smooth arc either toward or away from such centerlines to stretch the belt so that it serves to lock-up such shafts in a positive, progressive manner, and using a positive and reversible drive train. By so doing, lock-up may be achieved in a limited space in an effective manner while absorbing the energy pulses between the shafts.

The oscillation damping coupling of this invention is characterized by simplicity, low cost, ease of assembly, low friction, low natural frequency as compared to metallic compression spring systems, improved cushioning and vibration damping capability, large angular displacement repeatable performance and smooth operation over a long useful life. The configuration is dynamically balanced over the entire range of operation. It is particularly amenable to a large range of design variations to suit the parameters of specific applications.

This invention solves the problems of the prior art, or improves on the solutions offered by that art, or gives a viable alternative to the couplings taught by such art, by interconnecting a single set of pins eccentrically mounted on planet gears with a flexible member and by moving these pins either away from or toward the centerline of the shafts, in an arc, using a positive drive gradually to create sufficient torque to couple the shafts together.

Accordingly, prior to this invention, there was a need for a simple device to create adequate forces in a flexible belt or spring using the relative motion of the shafts to create a low-friction positive drive system for moving belt supporting the pins away from or toward the centerlines of the shafts to bring about this torque force. This invention, in filling this need, and solving the problems inherent in the prior art provides such an apparatus and, in doing so, gives the shaft coupling art improvements heretofore not known to such art.

SUMMARY OF THE INVENTION

Briefly described, this invention is an apparatus for transferring torque from one shaft to another. It is particularly useful as in conjunction with a torque converter lock-up clutch in motor vehicles and is effective in absorbing the shock of lock-up in an automatic transmission system and in damping vibrations between the engine and transmission shafts.

Such apparatus basically includes at least two rotatable members operably connected to two shafts, one of which shafts is driven by the other. Each of these rotatable members has a connecting part eccentrically mounted on it and a flexible connecting member connects these connecting parts together so that when one of the shafts is rotated this causes the rotatable member to rotate and each of the connecting parts on such members is thereby rotated, in an arc, whereby to change the length of the flexible connecting member and thereby its opposing force, so that torque is transferred from the shaft being rotated to the other shaft.

The flexible connecting member may be in the form of a shock-absorbing continuous belt; it also may comprise a plurality of springs or a plurality of shock-absorbing straps. Preferably such flexible connecting member is in the form of an elastomeric shaped belt, which is preformed and has sufficient stiffness to retain its shape. The belt has a plurality of sides, the number of which is determined by the number of connecting members.

In one embodiment each of the connecting parts is rotated, in an arc, away from the shafts which are aligned in end-to-end relationship; in another embodiment each of the connecting parts is rotated, in an arc, toward the said shafts. Preferably, one shaft is connected to the rotatable members by means of a ring gear; the rotatable members also may be pivotally connected to this shaft. The connecting parts are pins, preferably.

The flexible belt is stretched by the steady arcuate movement of the connecting parts or pins in a direction away from the shafts. This places increasing tension on the belt and enables the torque transfer to take place in a desirable manner. When compression springs are used as the flexible connecting member, the connecting pins are moved closer to the shafts to obtain a steadily increasing compressive force on the springs to bring about the torque transfer.

The belt is preformed to have the same number of sides as there are connecting pins and these sides are joined together by curved corners. Such curved corners of the belt are trained about the curved connecting members or pins and remain in place on such pins during operation of the apparatus. The preformed belt is relatively thick and retains its shape in its at rest position.

In another embodiment of this invention a third rotatable member is connected to the second rotatable members. The drive means may be connected to this third rotatable member or to the first rotatable member for rotating such members in a first direction whereby each of said connecting parts is rotated in an arc in a second direction. When the drive means is connected to the first rotatable member the length of the flexible connecting member is changed so that torque is transferred from the first rotatable member to the third rotatable member. When the drive means is connected to the third rotatable member for rotating it in a first direction the length of the flexible connecting member is changed so that torque is transferred from the third rotatable member to the first rotatable member.

Preferably the third rotatable member is a ring gear; it may also be a hub to which the rotatable members are pivotally connected.

More specifically, and preferably, an apparatus according to this invention includes a rotatable sun gear; at least two rotatable planet gears connected to this sun gear through meshing teeth; and, a rotatable ring gear connected to these planet gears through meshing teeth. Each of the planet gears has a pin eccentrically mounted thereon and a flexible belt connects these pins together. A drive means is connected to the ring gear for rotating it in a first direction whereby when such ring gear is rotated each of the pins is rotated, in an arc, in a second direction to change the length of the flexible belt so that torque is transferred from the ring gear to the sun gear, and thereby to rotate the sun gear in the first direction.

In this apparatus the ring gear may be operatively connected to a pressure plate which, in turn, is operatively connected to a rotatable engine shaft and, in a useful embodiment, the sun gear may be a rotatable transmission shaft or may be operatively connected to such shaft. There may be an odd or even number of planet gears. In one preferred embodiment, there are five (5) planet gears. The ring gear has a center of rotation which is free-floating with respect to the sun gear; the planet gears also are free-floating with respect to the sun gears.

In another preferred apparatus of this invention, the planet gears may be operatively connected to a rotatable shaft through a hub which is fixedly connected to such shaft. Each of the planet gears is pivotally connected to a pivot which is fixedly connected to this hub.

The first shaft or sun gear may be connected to the pins by meshing teeth. These teeth are located on the periphery of the sun gear and on the periphery of the planet gears.

In another embodiment an apparatus of this invention includes a first shaft; a second shaft having at least two connecting pins pivotally connected thereto; a flexible connecting member, either belt or spring, connecting the connecting pins together; drive means connected to one of the shafts for rotating it in a first direction; meshing teeth connecting the first shaft to the connecting parts; whereby when one of the shafts is rotated in the first direction the relative angular displacement of that shaft with respect to the other shaft causes each of the pins to pivot uniformly and equally in preselected arcs.

In greater detail this invention is an apparatus for transmitting torque from one shaft to another comprising a first shaft having a centerline, a second shaft having a centerline, the centerline being an extension of the centerline of the first shaft, the shafts being in end-to-end relationship; a hub connected to the second shaft; a plurality of pivots fixedly connected to the hub and spaced uniformly on the circumference of a circle having the centerlines of the shafts as its centerline; a plurality of pivot means pivotally connected to the pivots and pivotable in a plane normal to the centerlines of the shafts; a plurality of connecting parts at least one of which is mounted on each of the pivot means and spaced uniformly on the circumference of a circle also having the centerlines of the shafts as its centerline; a flexible connecting member connecting the connecting parts together; the first shaft having gear means on its circumference; the pivot means each having gear means on its circumference operatively connected to the gear means on the first shaft; drive means connected to either the first shaft for rotating it and the gear means on its circumference in a first direction or to the second shaft for rotating it in a first direction whereby when either shaft is rotated in the first direction each of said pivot means is also pivoted about the pivots in a second direction through the operative connection of the gear means on the circumference of the pivot means with the gear means on the circumference of the first shaft and; thereby pivoting the connecting parts, in an arc, in the second direction away from the first shaft; whereby to change the length of the flexible connecting member so that torque is transferred from one shaft to the other shaft and thereby to rotate the other shaft in the first direction.

In another embodiment this invention is an apparatus for transmitting torque from one shaft to another comprising a first shaft having a centerline; a second shaft having a centerline, such centerline being an extension of the centerline of the first shaft, and the shafts being in end-to-end relationship; a cover plate fixedly connected to the second shaft; a pressure plate frictionably connected to the cover plate; a ring gear operatively connected to the pressure plate; a plurality of planet gears operatively connected to the ring gear and rotatable in a plane normal to the centerlines of the shafts; a plurality of connecting parts at least one of which is fixedly and eccentrically mounted on each of the planet gears, the connecting parts being spaced uniformly on the circumference of a circle also having the centerlines of the shafts as its centerline; a flexible connecting member connecting the connecting parts together; the first shaft having gear means on its circumference; the planet gears each having gear means on its circumference operatively connected to the gear means on the first shaft; drive means connected to either the first shaft for rotating the first shaft and the gear means on its circumference in a first direction or to the second shaft for rotating it in a first direction whereby when the first or second shafts are rotated in the first direction each of the planet gears is also rotated through the operative connection of the gear means on the circumference of the planet gears with the gear means on the circumference of the first shaft and; thereby moving the connecting parts, in an arc, in a second direction away from or toward the first shaft; whereby to change the length of the flexible connecting member sufficiently to stop the rotation of the planet gears so that torque is transferred from the first shaft to the second shaft or vice-versa and thereby to rotate the first or second shafts in the first direction.

This invention further is a method of imparting rotary motion to a shaft including the step of changing the length of a flexible member connecting a plurality of connecting parts connected to a second shaft by rotating a first shaft in a first direction and thereby rotating the connecting parts, in an arc, in a second direction until sufficient torque is created to rotate the second shaft in the first direction.

In greater detail such invention is a method of imparting rotary motion to a shaft by changing the length of a flexible shock-absorbing belt, which is self-supporting and interconnects a plurality of pins which are connected to a second shaft, by rotating a first shaft in a first direction and thereby rotating the pins in an arc in a second direction away from or toward the first shaft until sufficient torque is created to rotate the second shaft in the first direction.

Lastly, stated another way, the present invention is a method of connecting one shaft to another for transmitting torque wherein an epicyclic drive train including planet gears and a flexible shaped member interconnects said shafts, the improvement comprising applying torque-transmitting forces to the planet gears whereby they are equally biased against rotation.

This invention, as embodied in the various apparatus and methods as described, as one example, solves problems existent in the prior art by positioning a flexible member about pins on rotatable planet gears which stretch the member smoothly as they move in an arc to absorb the shock of lock-up, and also the shocks occurring after lock-up, in a motor vehicle transmission system, in an improved workable manner.

BRIEF DESCRIPTION OF THE DRAWINGS

FIG. 1 is a cross-sectional view of a preferred apparatus of this invention showing first and second shafts coupled together by means of a multi-sided flexible member connected to connecting pins eccentrically mounted on pivotable planet gears which are operatively connected to a sun gear.

FIG. 2 is a somewhat schematic elevational view of the apparatus of FIG. 1 taken along lines 2—2 thereof. This embodiment uses a four (4) planet gear arrangement; the preformed flexible member, which is connected to the pins on these gears, has the same number of sides, four, as there are pins.

DESCRIPTION OF THE PREFERRED EMBODIMENTS

Figure 3:
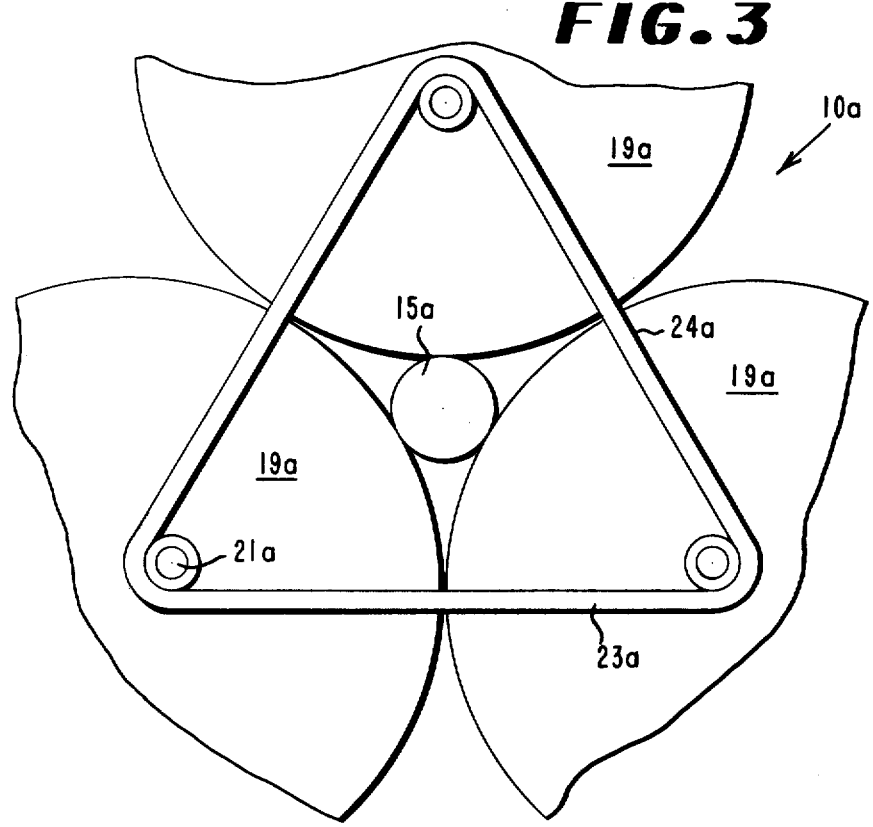
FIG. 3 is another embodiment of an apparatus of this invention, similar to the apparatus of FIGS. 1 and 2, shown schematically in elevation, but using three (3) planet gears.

This invention is an apparatus for and a method of transferring torque from one shaft to another in a drive system or drive train in such a way as to permit a large amount of energy storage and absorption to occur by virtue of large relative angular displacements of the two shafts. In a preferred embodiment, such apparatus and method are useful in coupling shafts, in an improved manner, in an automatic transmission system.

Referring to the drawings, a preferred apparatus of this invention, generally designated 10, is shown in FIGS. 1 and 2. In the apparatus of this embodiment, as well as in those of the other preferred embodiments, the shafts are coupled by means including a plurality of projections or pins eccentrically mounted on rotatable members and connected together by a flexible member which is stretched or compressed as such pins are moved in an arc, as the rotatable members are rotated, to transfer sufficient torque from one shaft to the other shaft to bring about a positive drive of both shafts. In doing this, the shock of shaft lock-up is absorbed; and, after lock-up, the continuing vibrations between the shafts are effectively damped.

In greater detail, the apparatus 10 of this invention includes a first shaft 11 having a centerline C/L-1 and a second shaft 12 also having a centerline, C/L-2 which essentially is an extension of the centerline of the first shaft 11. The shafts are in end-to-end relationship with each other and either one may be used to drive the other; that is, either the first or second shafts 11 or 12 may be suitably connected to a suitable power source or drive means, not shown, and driven thereby (i.e., it becomes the drive shaft), and in turn, it will drive the other shaft (i.e., the driven shaft) through the shock-absorbing coupling of this invention.

The first shaft 11 has gear means 13 on its circumference, as shown in FIG. 2. This gear means 13, in the form of teeth 14, which may be a part of the first shaft 11 or which may be connected to it by appropriate means, enables shaft 11 to perform as a first rotatable member or sun gear 15 in carrying out an important function of this invention.

The second shaft 12 is appropriately connected to at least two pivot means 16, having gear means 17, in the form of teeth 18, on their circumference, again as best seen in FIG. 2. In this particular embodiment, there are four pivot means. These teeth 18 mesh with the teeth 14 of the gear means 13, as shown, and enables such pivot means 16 to perform as second rotatable members or planet gears 19, again to carry out an important function of this invention.

Each of these second rotatable members 19 has a connecting part 20, preferably in the form of a pin 21 eccentrically mounted on one of its surfaces. These pins project outwardly from that surface and preferably have sliding or rolling element bearings 22 journalled thereabout. When these second rotatable members 19 are rotated, as will be further described, this movement causes these pins 21 to pivot or rotate in an arc, in this embodiment, away from the first and second shafts 11 and 12, and this positive gear-actuated movement of these pins 21 in this arc is of great importance in the practice of this invention.

Finally, to complete the basic coupling of the shafts 11 and 12, in this apparatus, a flexible connecting member 23, which will be described in much greater detail, is connected to the pins 21 operatively to connect the shafts together. Such flexible member 23 preferably is shaped or preformed to minimize bending stresses where relatively thick sections are bent over relatively small diameter curves. The member preferably is self-supporting. We prefer to use a high modulus elastomer to attain high torque handling capability. It has give and must be capable of recovering its size and shape after being stretched. The preferred flexible connecting member or belt 23 differs from other flexible objects, such as a rubber band, which does not retain its shape (i.e., it is not self-supporting) and is limp and accepts the configuration into which it moves after being placed on a given surface. For the purposes of this disclosure, flexible means something that is both elastic and resilient; elastic implies the property of resisting deformation by changing length and resilient implies the ability to recover shape quickly when the deforming force or pressure is removed.

The flexible member 23 essentially is formed so that it has a plurality of sides 24, with the number of sides depending on the number of pins about which such flexible member is placed or to which it is connected. The straight sides 24 of the flexible member 23 are joined by curved corners 25 which fit around the periphery of the pins 21, or around elongated, i.e., large radius shoes, not shown, on such pins, and remain there throughout the operation of the apparatus. Stated another way, this shaped flexible member 23 is positioned on or about the bearings 22, or elongated shoes, on the pins and stays in place; it differs in this respect from a drive belt which moves relative to pulleys or pins to create a driving force. In conventional friction type drive belts, for example, the belt, which is not self-supporting, moves about a set of pulleys so that power is transmitted through the belt from a drive pulley to a driven pulley, and such belt is constantly moving about or with respect to the pulleys. The flexible member of this invention is not a power transmission belt adapted for movement in a curved endless path around the pulleys; it instead is an energy-absorbing, energy-storing, shock-absorbing flexible spring.

As operatively connected to the pins 21 this unusually-self-supporting, flexible member 23, which remains in place on the pins 21 during operation, plays an extremely important role in the instant invention. That is so because upon rotation of either the first or second shafts 11 or 12 the second rotatable members 19 are caused to rotate due to the operative connections between both of these shafts as will be explained in greater detail, and this, in turn, causes the pins 21 also to rotate or move in an arc away from the shaft centerlines to stretch the flexible member 23. This stretching movement changes the length of the flexible connecting member 23, as a function of the relative angular displacement between shafts, sufficiently so that torque is transferred from the shaft that is being driven to the other shafts, in an improved fashion.

That transfer, which utilizes the operative connection of these arcuately moving pins 21 with the flexible member 23, is a touchstone of this invention. The controlled arcuate movement of these pins 21 enables the torque transfer to be smooth and by coupling the shafts 11 and 12 together using this flexible member 23 which interconnects such pins, improved damping of vibrations is accomplished. For this reason, the apparatus of this invention is particularly useful as a torque transfer device in that it provides an energy-storing, shock-absorbing, lock-up of end-to-end shafts while damping the transmitted energy forces between such shafts after lock-up occurs.

As has been stated, each of the second rotatable members 19, on which the pins 21 about which the flexible member 23 is trained, is pivotably connected to the second shaft 12 in a manner whereby rotation of the second shaft 12, or the first shaft 11 for that matter, will bring about rotation of these rotatable members 19.

A typical workable connection, as shown in FIGS. 1 and 2, for example, includes a hub 26 (which functions as a third rotatable member in accordance with this disclosure), which is fixedly secured at one of its surfaces to the second shaft 12 by appropriate means, not shown. A plurality of pivots or studs 27 are fixedly connected to the other surface 26' of the hub 26 and each of the second rotatable members 19 is pivotally connected to the hub 26 through these pivots 27. A suitable bearing 28, which may be of porous metal, is interposed between the pivots 27 and the second rotatable member 19, as is known to the art to permit the pivoting motions to occur.

As shown, the bearings 28 are held in place on the pins 27 between spacer elements 30 and 31 which exhibit low friction. This permits the second rotatable members 19, or pivot means 16, to swing freely. Disposed on either side of the spacer elements 30 and 31 are side plates 32 and 33, which stabilize the structure and also form a subassembly. The pins 21 are held in place on the surface of the second rotatable members 19 by snap rings 34 and 35 while the bearings 22 are held in place on such pins 21 by spacer elements 36 and 37.

Where it is desired to provide limited rotational capability in the event of a failure of the flexible member 23, stops, not shown, may be employed. These would be installed outside the usual working limits of the particular application as will be apparent to one skilled in the art. For example, in a structure such as that shown in FIG. 2, the rotatable members 19 on exceeding the desired maximum pivoting motion in either direction would strike stops fixed to the hub surface 26' limiting further motion. Stops may also serve to prevent unwanted contact of parts that might cause progressive damage. For example in FIG. 11 excessive angular displacement between the shafts 52 and 51 will cause contact between the outside of the belt 63 and the inner surface of the ring gear 66 which may damage the belt. To prevent this, stops may be placed to limit the angular relationship to approximately 150°. Such stops may be placed outside the coupling system itself and are not shown.

The pivots 27 are spaced uniformly on the circumference of a circle having the centerlines of the shafts 11 and 12 as its centerline. The second rotatable members 19 as connected to these pivots 27, as previously described, are pivotable in a plane normal to the centerline of the shafts 11 and 12 and, in this embodiment, basically function broadly as pivot means 16. The connecting parts or pins 21 are fixedly mounted on this pivot means 16 (or second rotatable member 19) and are spaced uniformly on the circumference of a circle also having the centerlines of the shafts 11 and 12 as its centerline. Upon the rotation or pivoting of these second rotatable members 19, such pins 21 will move from the solid line positions in an arc and into the dotted line positions, as shown in FIG. 2. This stretches the flexible member 23 until the desired torque transfer forces are created.

Such rotation of the second rotatable members 19 may be brought about by rotating the second shaft 12 and hence the third rotatable member or hub 26, which is fixed to it. This in turn will cause the second rotatable members 19 to pivot about their pivots 27, which are fixedly connected to the hub 26. Alternatively the rotation of these second rotatable members 19 may be brought about by rotating the first shaft 11. When this is done, the meshing teeth, 13 on the first shaft 11 and 14 on the second rotatable members 19 will cause the second rotatable members 19 to pivot about their pivots 27 on hub 26. In other words, as either of the shafts 11 or 12 is rotated in a first direction as shown by the arrow in FIG. 2, this will cause the second rotatable members 19 to rotate, as shown by the arrow, about their pivots 27 and, thus, the arcuate movement of the pins 21 which are fixedly connected to the second rotatable members 19, in a second direction and away from the shafts 11 and 12. This movement changes the length of the flexible member 23, by stretching it, and causes the transfer of torque to occur between the shafts 11 and 12 when the force developed in the flexible member is sufficient.

Stated another way, in this preferred apparatus the first shaft 11 functions basically as a first rotatable member or as a sun gear, designated, 15, while the second rotatable members 19 function basically as planet gears, also designated 19. When the first shaft 11 is displaced angularly relative to the second shaft 12, the sun gear 15 drives all of the planet gears 19 through an angle proportional to the angle of shaft displacement depending on the gear ratio. This moves the pins 21 on the planet gears 19 in an epicyclic path relative to the centerlines of the shafts 11 and 22 through an angle by a finite and controlled amount determined by the geometry, thus stretching the flexible member 23 connected to these pins 21 and increasing the torque transmitted by an amount depending on the extension of this member 23 and its spring constant. Thus torque transfer between the shafts 11 and 12 is accomplished.

The preferred apparatus 19 in the embodiment of this invention just described, and as shown in FIGS. 1 and 2, shows the use of a four-sided flexible member 23, which is operatively connected to the four pins 21 on the pivotable planet gears 19. In this embodiment the sun gear 15 is in a one-to-one relationship with the planet gears 19. The number of gears and their size is a matter of choice, as will be discussed in further detail.

Similarly, the use of planet gears 19 in the form of gear sectors, as shown in FIG. 2, is a matter of choice. For example, where greater outside diameters are permitted, full circumference gears might be employed. These would be useful in an application where additional softness might be needed, which can be obtained by addition of an internal gear, or ring gear, to drive the planet gears 19, thereby adding additional degrees of differential rotation of the two shafts to full torque, and reducing the slope of the torque-rotation curve. This will be discussed in greater detail later. Further, utility of full circumference gears is seen in applications where a torque limit is imposed, the full gears permitting the assembly to go over center when the maximum torque is reached so that, in starting a heavy load for example, a series of power impulses could be given to a load. This is commonly known as a "torque limiting coupling".

Figure 10:
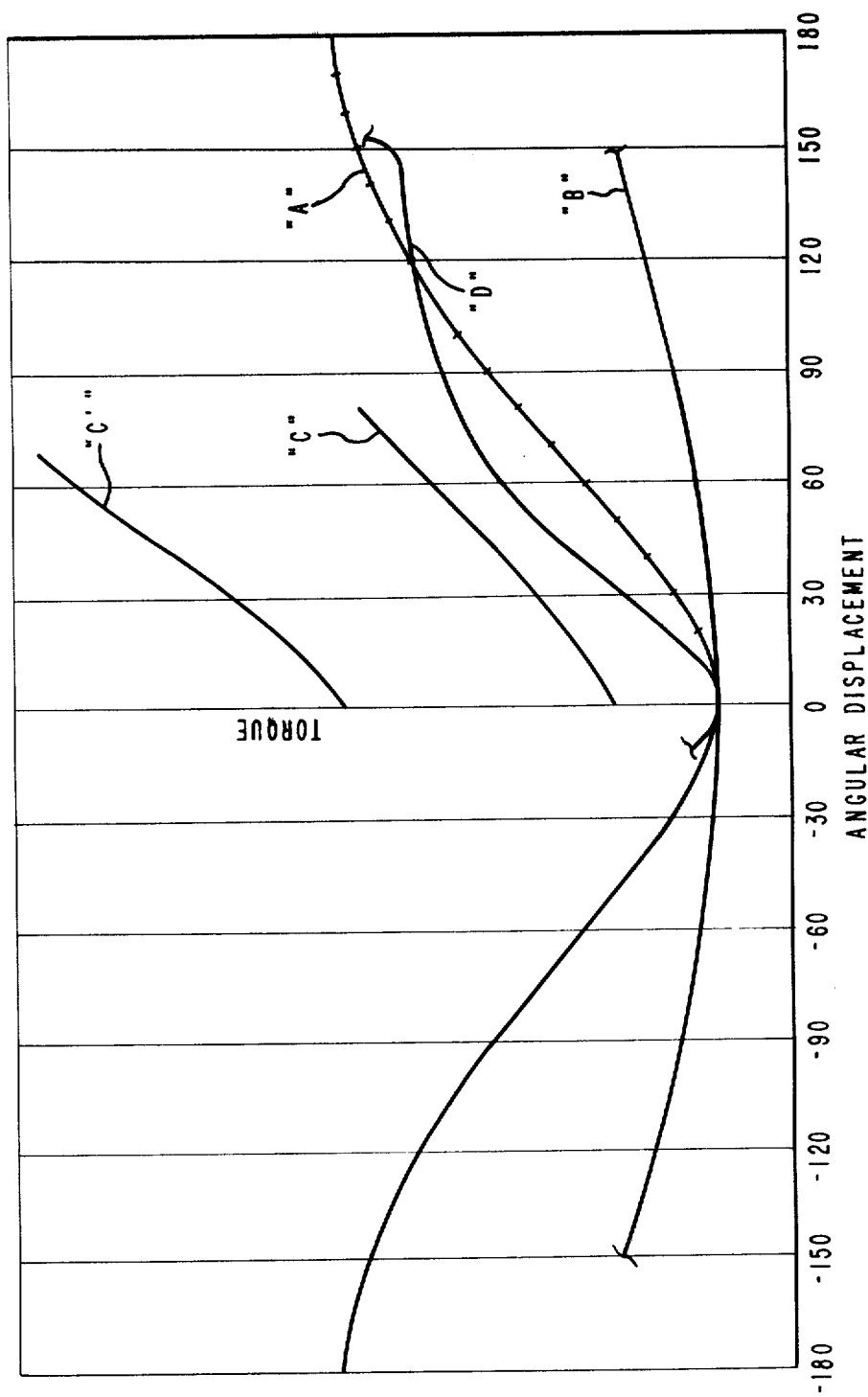
FIG. 10 is a force versus angular displacement diagram illustrative of the operation of some of the typical embodiments of this invention.

It further should be noted, in the apparatus 10 of FIGS. 1 and 2, that the pins 21 in their initial rest position are on lines from the center of the sun gear 15 to the center of the planet gears 19. This permits two-directional action and also provides a force versus angular displacement relationship which initially has a low slope but increases rapidly with angular displacements after the pins 21 have swung through some considerable angle and then levels off again. This may be seen by referring to the curve labeled "A", in FIG. 10. FIG. 10 also shows the relationship for a softer system such as shown in the apparatus of FIG. 3 to be described. The curve is labeled "B". Further, one-directional, harder systems as shown in the curves labeled "C" and "C'" in FIG. 10 could be attained by using gear stops and selecting the initial position of the pins 21 at a significant angle to the line of centers of the sun gear 15 and planet gears 19. The slope of these curves, of course, is a direct function of mechanism geometry and the elastic constant of the flexible member 23 employed which depends on material and dimensional factors, as is well known. In the embodiment of FIG. 2, for example, there is shown a final or operating position of the input versus the output which is 60° from the initial. It represents an elongation or stretching of the flexible member 23 from about 5% to approximately 25%, which has been practical for some applications.

If a softer force-displacement relationship is desired the 1:1 ratio of the apparatus of FIGS. 1 and 2 may be changed. For example, in stretching a "square" shaped or four-sided, preformed flexible member 23 by the arcuate movement of the four eccentric pins 21, it is possible for the planet gears 19 to be nominally twice as large as the sun gear 15. This limit is physical; beyond an approximate 2:1 ratio depending on tooth size, the four planet gears, would touch and lock. This design capability again illustrates the type of changes which may be made in the apparatus 10 of this invention to accomplish desired operational goals.

An important aspect of this invention, then, is the wide flexibility or geometric predictability made available to the user, depending upon the results desired, while still operating within the concepts of the invention. For many uses the apparatus of FIGS. 1 and 2 may be preferred, with the four-sided "square" flexible member 23 being connected to the four pins 21 in the planet gears/sun gear arrangement, as shown. This one-to-one gear ratio arrangement will work well for a given use or uses. Further the pivotal movement of the planet gears 19 about their fixed pivots 27 provides for relative ease of operation of the gears, without binding, and a solid gear base within which to operate. It is particularly preferred for uses where the space requirements are not limited. However, it is nonetheless still possible, by just changing the gear configurations and numbers of gears, for example, or the eccentricity of the pins, or the characteristic of the springs, to meet untold other desired uses, without departing from the inventive concept.

FIGS. 3, 4, 5, 6, 7, 8 and 9 show various embodiments of the apparatus of this invention, and further illustrate the flexibility of design available to the user. In brief, in the apparatus of FIGS. 3, 4, 5, 6 and 7 there are changes as compared to the apparatus shown in FIGS. 1 and 2 in gear shapes and in gear numbers; in FIG. 8, the flexible member is not continuous, but is in the forms of straps; and in FIG. 9, the flexible member is in the form of a metallic or nonmetallic compression spring which is moved toward the shafts due to placement of the connecting pins to generate torque transfer; otherwise these apparatus are similar to the preferred apparatus shown in FIGS. 1 and 2, and their parts and operation are the same or are similar.

The apparatus 10a, as shown in FIG. 3, is identical to the apparatus 10 of FIGS. 1 and 2 except it uses a three-sided flexible member 23a to interconnect pins 27a on three pivotable planet gears 19a together, as a means of transferring torque between the shafts. Further, it will be noted, the size of the gears have been varied, as compared to the gears of the apparatus of FIGS. 1 and 2. By doing this higher gear ratios are made possible, by using this flexible member 23a, molded in a "triangular" form with its three sides 24a, which is trained around the pins 23a on three relatively large planet gears 19a which surround a smaller sun gear 15a. Up to a little over a 6:1 gear ratio may be employed, using the embodiment. This is another example of the operational flexibility of this invention.

Figure 4:
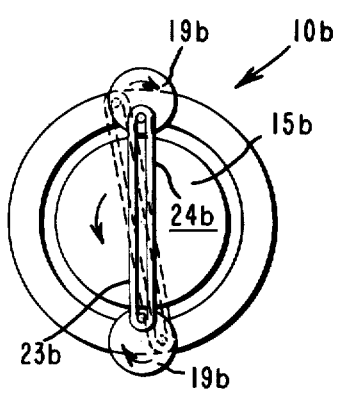
FIG. 4 is still another embodiment of an apparatus of this invention, similar to the apparatus of FIGS. 1 and 2, shown schematically in elevation, shown using two (2) planet gears.
Figure 5:
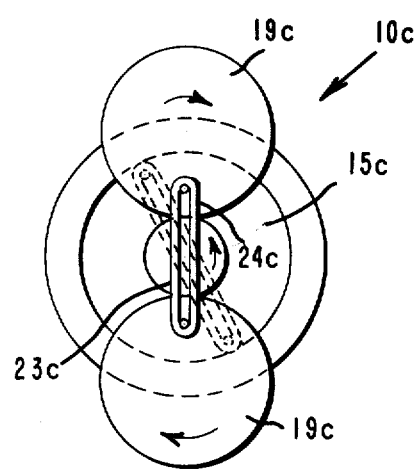
FIG. 5 is another embodiment of an apparatus of this invention, similar to the apparatus of FIG. 4, but using different-sized planet gears, shown in elevation.

Similarly a two planet gear system, as in the apparatus 10b and 10c, as shown in FIGS. 4 and 5 could be used where extremely high gear ratios are employed. In this embodiment, the flexible members 23b and 23c are two straight sides 24b and 24c. Either the sun gear can be the larger, as is 15b in FIG. 4, or the smaller, as 15c in FIG. 5, as compared with planet gears 19b and 19c, respectively.

Figure 6:
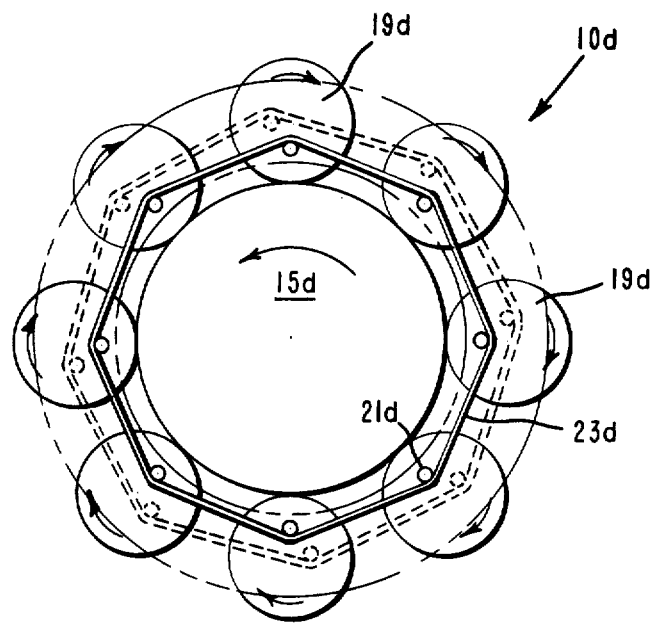
FIG. 6 is still another embodiment of an apparatus, similar to that shown in FIGS. 1 and 2, shown in elevation, and using eight (8) planet gears.

On the other hand still another embodiment 10d of the invention is shown in FIG. 6 in which an eight-sided flexible member 23d is used to connect pins 21d on eight small pivotable planet gears 19d together. These planet gears 19d mesh with a larger sun gear 15d and upon rotation the pins 21d are pivoted in arcs and into the dotted line positions as shown to stretch the flexible member 23d sufficiently to transfer torque between the shafts. All of these embodiments just described are just further examples of the operational flexibility of the apparatus of this invention.

Figure 7:
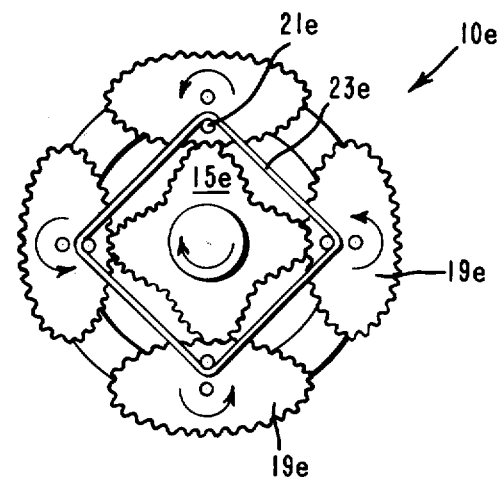
FIG. 7 is yet another embodiment of an apparatus of this invention similar to the apparatus of FIGS. 1 and 2, shown somewhat schematically in elevation, and using noncircular gears.

If further is possible to use noncircular gears in the practice of this invention. By employing such gears, as shown in FIG. 7, the torque versus angular displacement characteristic can be varied to a certain degree. The system will be stiff initially but become much softer as angular displacement increases. In this embodiment the parts are counterparts of those of the apparatus shown in FIGS. 1 and 2 and the apparatus 10e operates in the same manner, except for gear design changes. In other words, such apparatus 10e uses four planet gears 19e similar to the four planet gears used in the apparatus of FIGS. 1 and 2 except these planet gears 19e are noncircular, as is the sun gear 15e which meshes with these gears. A four-sided flexible member 23e is trained around connecting pins 21e so that when these pins are pivoted in an arc, the flexible member is stretched to transfer torque between the shafts and thereby to rotate both shafts in a steady state condition.

Figure 8:
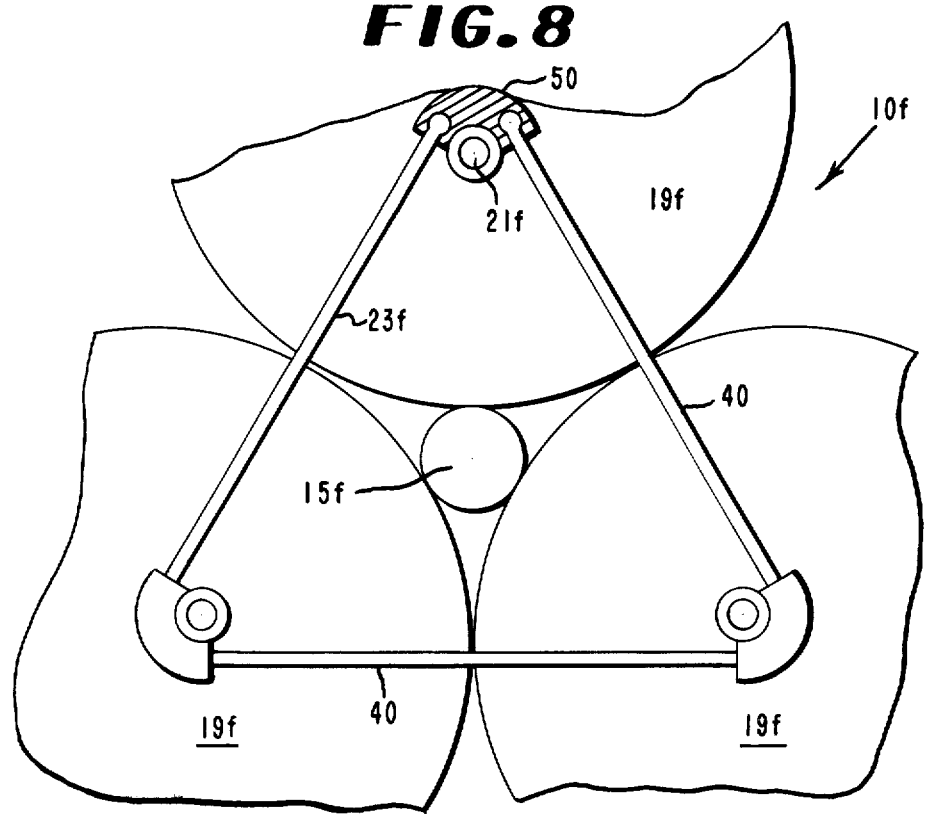
FIG. 8 is still another embodiment of an apparatus, similar to FIGS. 1 and 2, shown in elevation, and in which the flexible member is in the form of straps.

FIG. 8 shows still another apparatus 10f of this invention; it is identical in all respects to the apparatus 10a shown in FIG. 3 except the flexible members 23f in this embodiment are in the form of three flexible straps 40 which are suitably connected by a link so as shown to three connecting pins 21f fixedly connected to three planet gears 19f which mesh with a smaller sun gear 15f. Again, when the pins 21f, are pivoted in an arc away from the shaft centerline, this causes the flexible straps 40 to stretch sufficiently to bring about torque transfer.

Figure 9:
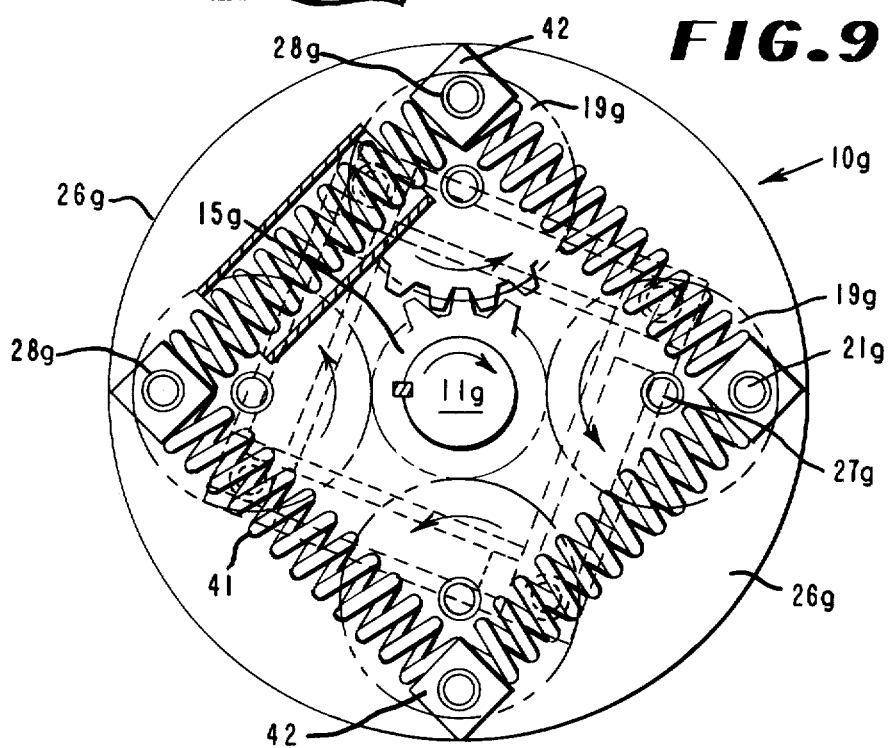
FIG. 9 is still a further embodiment of an apparatus, similar to that shown in FIGS. 1 and 2, using metallic springs loaded in compression, and shown in elevation in schematic form.

FIG. 9 is a still further embodiment of an apparatus 10g of this invention which employs springs 41 loaded in compression as the flexible member. These compression springs 41 are positioned between pins 21g which are fixedly connected to four planet gears 19g which are pivotably connected to pivots 27g which, in turn are fixedly connected to the hub 26g.

Suitable end blocks 42 are rotationally located on the bearings 28g to hold the ends of the springs 23g in place. The pins 21g are initially located on the extreme side of the planet gears 19g relative to the pivots 27g from centerline of the shafts and with respect to sun gear 15g. Such springs 41 may be encased in covers to minimize radial motion under centrifugal force or buckling. In this embodiment, the rotation of shaft 11g in either direction from the position shown decreases the spacing between the pins 21g, thus increasing the compression on the springs 41g to an extent that torque is transferred between the shafts.

All of these embodiments, 10a, 10b, 10c, 10d, 10e, 10f and 10g, of the apparatus of the invention just described are basically variations on the apparatus 10 shown in FIGS. 1 and 2.

In all of such embodiments, the shafts are coupled together by means including a flexible member connected to a plurality of projections or pins eccentrically mounted on rotatable members or planet gears which are pivotably connected to a hub. This flexible member is stretched or compressed as the pins are moved in an arc, as the rotatable members are rotated or pivoted about the fixed pivots, to transfer sufficient torque from one shaft to the other shaft to bring about a positive drive of both shafts.

Figure 11:
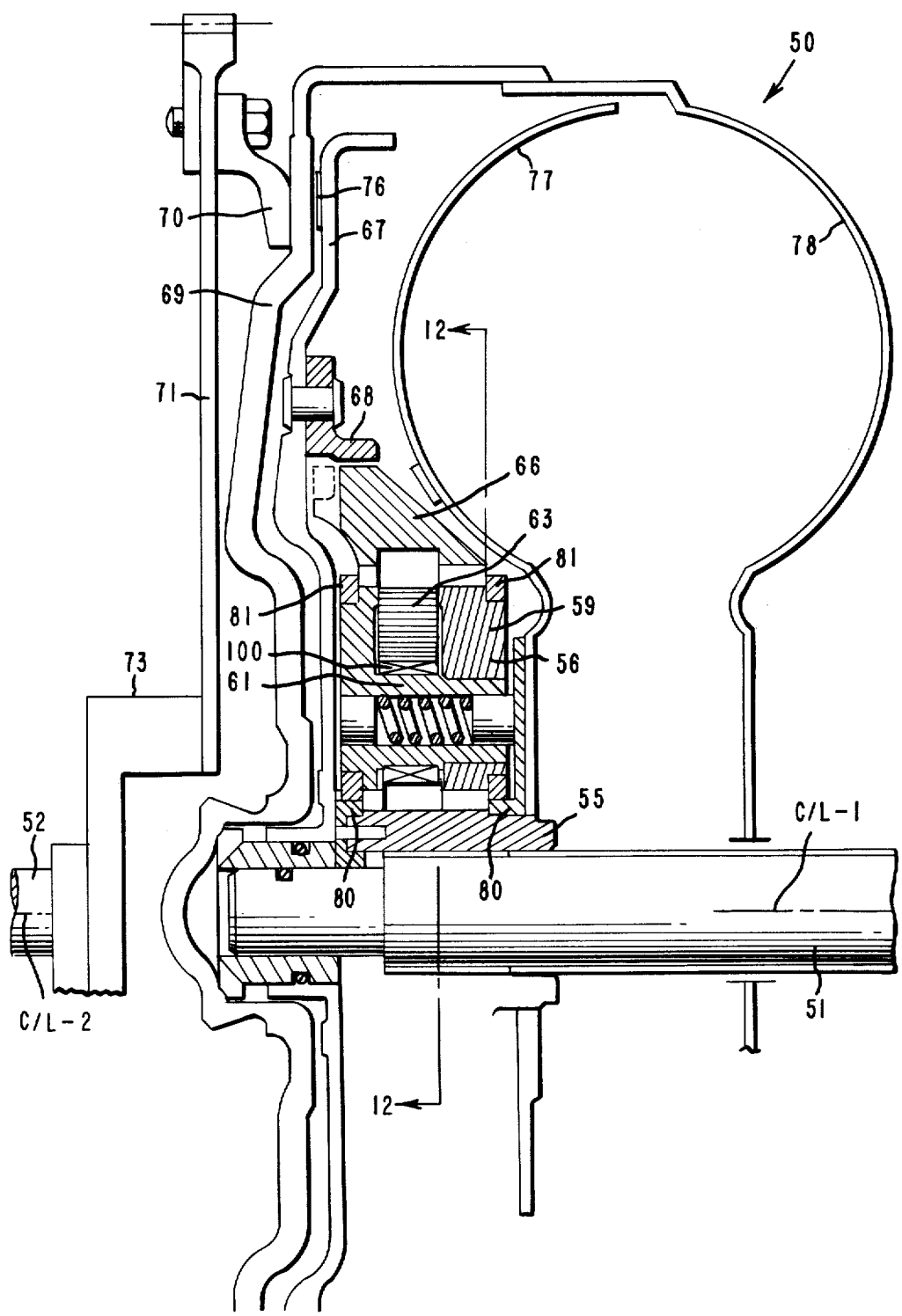
FIG. 11 is an elevational view, in cross section, of another preferred apparatus of this invention, which is similar to the apparatus of FIGS. 1 and 2, but in which the coupling together of the two shafts is accomplished using free-floating ring and planet gears, rather than pivotable planet gears.

FIG. 11 shows, in elevational cross-section, another preferred apparatus 50 of this invention. It is similar to the previously described apparatus of FIGS. 1 and 2, but in this apparatus the coupling together of the two shafts is accomplished using free-floating planet gears, rather than pivotable planet gears. The use of this apparatus 50 is particularly preferred in those instances where space is limited. It also has certain advantages in weight and in producing a softness of transfer of torque, in improving driveability in certain motor vehicle uses.

As has been explained, the preferred apparatus 10, just described, uses the pivoting motions of the second rotatable members 19 to move the pins 21 in an arc with respect to the fixed pivots 27 to bring about the stretching of the flexible member 23 trained about the pins to transfer torque. This is preferred for some uses, particularly in those instances where there is adequate working room for the parts. In the other preferred embodiment 50, which now will be described, these second rotatable members or planet gears are free-floating, and are not connected to fixed pivots. In this description, "free-floating" means the center-to-center distance of the meshing gears is established by means other than fixed shafts. This embodiment, while requiring the addition of means to prevent the meshing teeth on the sun and planet gears from locking due to friction, is preferred in instances where there is limited working space. Moreover, embodiment 50 employs an additional rotatable member in the gear train providing a full epicyclic drive and permits a greater angular difference between shafts for the same spring member elongation providing a greater softness of torque transfer.

In greater detail, the apparatus 50 of this invention includes a first shaft 51 having a centerline C/L-1 and a second shaft 52 also having a centerline C/L-2, which essentially is an extension of the centerline of the first shaft 51. The shafts are in end-to-end relationship with each other and either one may be used to drive the other; that is, either the first or second shafts 51 or 52 may be suitably connected to a suitable power source or drive means, not shown, and driven thereby (i.e., it becomes the drive shaft), and, in turn, it will drive the other shaft (i.e., the driven shaft) through the shock-absorbing coupling of this invention but ordinarily shaft 52 is engine-driven.

Figure 12:
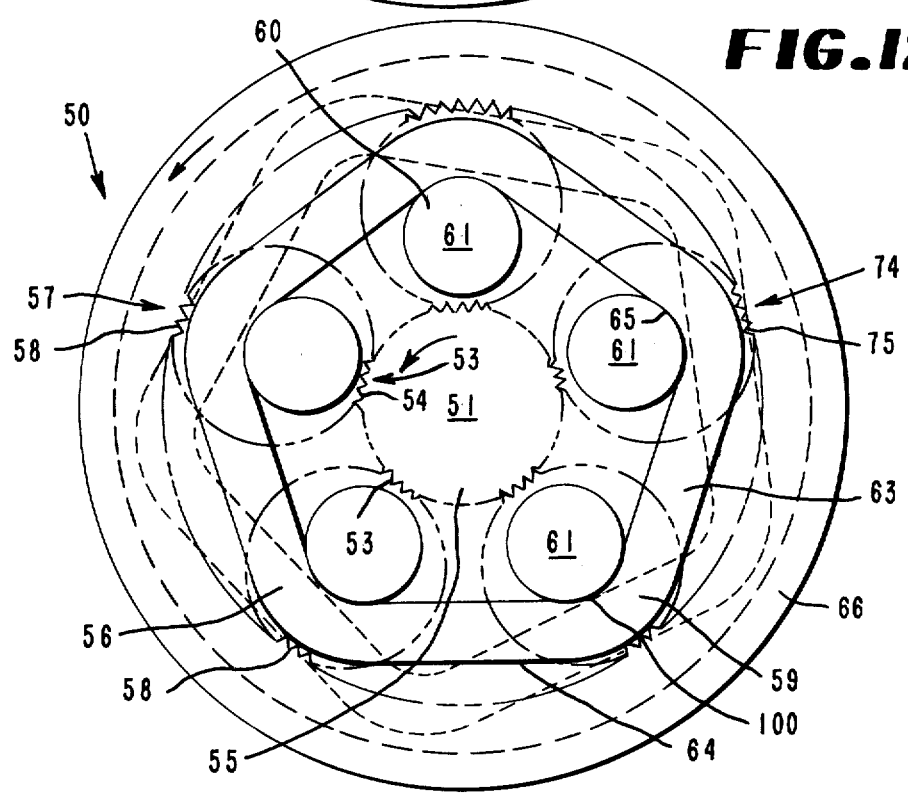
FIG. 12 is a cross-sectional view of FIG. 11 taken along lines 12—12 thereof, and showing a five (5) planet gear arrangement.

The first shaft 51, which, in a preferred embodiment, may be a transmission shaft, for example, has gear means 53 on its circumference, as shown in FIG. 12. This gear means 53, in the form of teeth 54, which may be a part of the first shaft 51 or which may be connected to it by appropriate means, enables shaft 51 to perform as a first rotatable member or sun gear 55 in carrying out an important function of this invention.

The second shaft 52, which in the preferred embodiment being described is an engine crank shaft, is appropriately connected, as will be described, to at least two second rotatable members 56, having gear means 57, in the form of teeth 58, on their circumference, again as best seen in FIG. 12. In this particular embodiment, there are five second rotatable elements. These teeth 58 mesh with the teeth 54 of the gear means 53 on the first shaft 51, as shown, and enables such second rotatable members 56 to perform as planet gears 59, again to carry out an important function of this invention.

Each of these second rotatable members 59 has a connecting part 60, preferably in the form of a pin 61, eccentrically mounted. These pins 61 preferably have sliding or rolling element bearings 100 thereon. If desired appropriate elongated (i.e., large radius) shoes, not shown, may be placed on the pins better to distribute the forces placed on such pins by the flexible belt, to be described, while trained about such pins 61. When these second rotatable members 59 are rotated, as will be further described, this movement causes these pins 61 to rotate in an arc and, in this embodiment, away from the first and second shafts 51 and 52 and this positive, gear-actuated, movement of these pins 61 in this arc is of great importance in the practice of this invention.

Further, a flexible connecting member or belt 63 is connected to the pins 61 operatively to connect the shafts 51 and 52 together.

The flexible member 63 preferably is formed so that it has a plurality of sides 64, with the number of sides depending on the number of pins 61 about which such flexible connecting member 63 is placed or to which it is connected. The straight sides 64 of the flexible connecting member 63 are joined by curved corners 65 which fit around the periphery of the bearings 100 on pins 61 and remain there throughout the operation of the apparatus. As best seen in FIG. 12, the flexible connecting member or belt 63 is relatively thick, as is the belt 23 in the apparatus 10, and preferably is performed into its desired shape which shape it retains in its at rest position.

As operatively connected to the pins 61 this self-supporting flexible member 63, which remains in place on the pins 61 during operation, plays an extremely important role in the instant invention. That is so because upon rotation of either the first or second shafts 51 or 52 the second rotatable members 59 are caused to rotate due to the operative connections between both of these shafts and such members, as will be explained in greater detail, and this, in turn, causes the pins 61 to move in an arc away from the shaft centerlines thereby to stretch the flexible connecting member 63. This stretching movement changes the length of such flexible connecting member 63 sufficiently so that torque is transferred from the shaft that is being driven to the other shaft, in an improved fashion.

As has been stated, each of the second rotatable members or planet gears 59, on which the pins 61 about which the flexible member 63 is trained, is free-floating but is connected to the second shaft 52 in a manner whereby rotation of the second shaft 52, or the first shaft 51 for that matter, will bring about rotation of these rotatable members 59.

A typical workable connection, as shown in FIGS. 11 and 12, for example, includes a ring gear 66 (which functions as a third rotatable member, in accordance with this disclosure), which is operatively connected at one of its surfaces to a pressure plate 67 through a suitable ring gear retainer or drive lugs 68. This plate 67, in turn, is adapted to be frictionally or operatively connected to a cover plate 69 which, in turn, may either function as a second shaft or which may be fixedly connected to the second shaft 52 using lugs 70 which are connected to a flexplate 71 by screws 72, which flexplate 71 is suitable and fixedly connected to the second shaft 52 by a hub 73. Suitable springs and buttons serve to bias the pressure plate toward the cover plate, as shown.

The sun gear 55 is preferably connected to the torque converter turbine which is splined to the first shaft or transmission shaft 51.

The ring gear 66, which also is free-floating, has inner gear means 74, in the form of teeth 75 which mesh with the teeth 58 on the circumference of the planet gears 59, whereby when the second shaft 52 is rotated in a first direction each of said planet gears 59 is also rotated through the operative connection of the gear means 57 on the circumference of the free-floating planet gears 59 with the gear means 74 on the circumference of the ring gear 66 and also with the gear means 53 on the sun gear 55 and thereby move the connecting parts or pins 61, in an arc, in a second direction and away from the first and second shafts 51 and 52 whereby to change the length of the flexible connecting member 63 so that torque is transferred from the second shaft 52 to the first shaft 51 and thereby to rotate the first shaft 51 in the first direction.

This apparatus 50, too, is well suited for use in transferring torque in an automatic transmission system. Full torque is transmitted by a nominal 150° rotational difference between the transmission shaft 51 and the engine crank shaft 52. The engine crank shaft 52 is in end-to-end alignment with the transmission shaft 51. The pressure plate 67 operatively engages the torque converter cover plate 69 at an appropriate time, when lock-up of the transmission is desired, by an appropriate means such as a friction surface 76. Otherwise the drive train proceeds with slip through a turbine 77 interacting hydraulically with a pump 78 which is fastened to the cover plate 69, as shown in FIG. 11.

On lock-up, rotation of the engaged clutch plate or cover 69 with the pressure plate 67 turns the ring gear 66 relative to the first shaft 51. This, in turn, rotates the planet gears 59. There are preferably five planet gears 59 so as to hold the gear tooth loading to a reasonable value for a functional face width which is employed in this preferred embodiment. As is well known in planetary gear systems, all the planet gears 59 are free to turn or rotate with the ring gear 66. This rotation of these planet gears 59, in turn, rotates the shaft 51, through the sun gear 55 and other connections, in the same rotational direction as the second shaft 52, and ring gear 66.

The planet gears 59 are divided and centrally carry the eccentric pins 61. Interconnecting all of the pins 61 is the flexible member 63, which is changed in length by rotation of the planet gears 59. It will be seen in FIG. 12, that all of the eccentric pins 61 are positioned as close as possible to the centerline of the shaft 51 and as close as possible to each other, in their start-up positions. The flexible connecting member 63 is at its minimum working extension in this position although under some selected preload, which ordinarily is set at about 5 percent from its length at rest prior to assembly.

If the planet gears 59 are rotated 180° then it would follow that maximum extension of the flexible connecting member or belt 63 would occur. However, maximum torque is transmitted at some intermediate point due to the relationship of forces and geometry. In practice the belt 63 is designed such that an extension of about 21 percent occurs at about 150° of rotation of the transmission shaft 51 relative to the engine shaft 52. The torque displacement relationship is similar to curve "D" in FIG. 10. The vertical portion results from the action of the stops not shown.

It also should be noted that no carrier for the planet gears 59 is shown. This is a result of the close geometry into which this coupling must fit in the preferred embodiment. Ordinarily a carrier is employed and in alternate embodiments a carrier will be found. The function of such a carrier is to space the gear elements and ensure proper meshing. It is known to operate planetary gear systems without a carrier for planet gears, but only where loads are light. In the embodiment of FIGS. 11 and 12, however, 200 foot pounds of torque frequently is transmitted and the inward radial components of force flexible member 63 can approach 3500 pounds. This tends to force the meshing teeth 58 of the planet gears 59 into the teeth 54 of sun gear 55 causing jams, scuffing and the like. Since the distance between engine and transmission prevents the use of a carrier in this embodiment, a carrier-less planet gear support is provided, as will now be explained.

As has been described, the flexible member 63 as wrapped around the pins 61 exerts a considerable inwardly directed force on the planet gears 59. This happens because these planet gears 59 are free-floating and are not connected to fixed pivots as are the planet gears 19 in the apparatus shown in FIGS. 1 and 2, for example. Such force may cause the gears to jam or function improperly. To prevent this from happening, such gears, preferably both the sun gear 55 and each of the planet gears 59, are provided with "tires" or races appropriately mounted on their circumferences, as shown in FIG. 11. These races may be fabricated of suitable material for rolling contact and are permanently fastened to the gears by means not shown, such as by welding or preferably shrunken or the like to the respective gears. The sun gear 55 carries a race 80 on each end having a diameter which corresponds to the pitch diameter of the sun gear and the planet gears 59 each carry on each end a race 81 having a diameter the same as the pitch circle diameter. These races 80 and 81 provide adequate tooth clearance so that the sum and ring gears do not bind or lock during operation due to the pull exerted on the planet gears 59 pulling them toward the sun gear 55.

A suitable device using races of this type for a similar purpose is shown in U.S. Pat. No. 4,136,580 to Brand et al., which patent is incorporated in this disclosure by reference. Such races shown in this patent may be used on the sun and planet gears of the apparatus of this invention to accomplish the desired result of preventing gear binding.

Another device usable in this apparatus to provide proper gear clearance, but less preferred, is shown in U.S. Pat. No. 2,674,898 to Mudersbach, which patent also is incorporated by reference in this disclosure. In such device, rim portions are affixed to the gears to prevent overmeshing; these portions, if made to be of the same diameter as the pitch of the gears, could be used to assure proper meshing of the sun gear 55 with the planet gears 59, in the apparatus 50 of this invention. These patents, accordingly, show appropriate means to prevent overmeshing of teeth on coacting gears; such means may be used to accomplish this same purpose in the instant invention.

Figure 13:
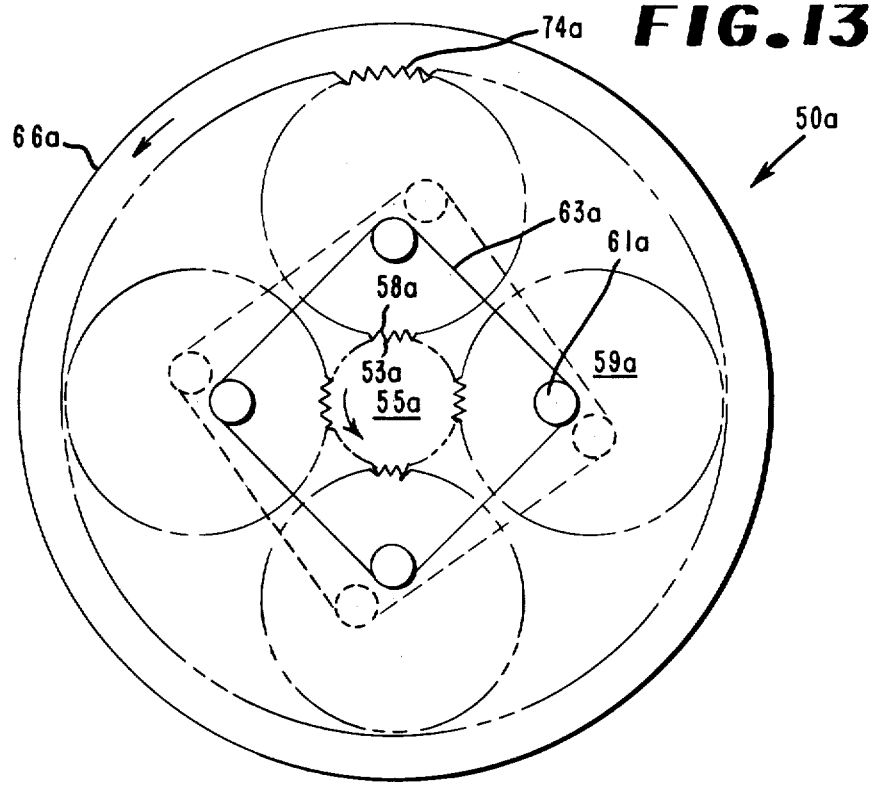
FIG. 13 is another schematic embodiment of the apparatus shown in FIGS. 11 and 12, but using four (4) planet gears.

Apparatus 50 is another example of the flexibility of this invention. Still another example is the apparatus 50a shown in FIG. 13 which uses a different sun gear/planet gear geometry. Briefly this apparatus replaces the five (5) planet gears 59 shown in FIG. 12 with four (4) free-floating planet gears 59a, which mesh with a smaller sun gear 55a than that shown in FIG. 12. A plurality of connecting parts or pins 61a are fixedly and eccentrically mounted on each of the planet gears 59a and such connecting parts 61a are spaced uniformly on the circumference of a circle also having the centerlines of the shaft as its centerline. A flexible connecting member 63a connects the connecting parts 61a together. The sun gear 55a has gear means 53a on its circumference and the planet gears 59a each have gear means 58a on its circumference operatively connected to the gear means 53a on the sun gear 55a.

Drive means are connected to the second shaft 52 (see FIG. 11) for rotating it in a first direction. When this is done and the first shaft 52 is rotated in the first direction each of the planet gears 59a is also rotated through the operative connection of the gear means 58a on the circumference of the planet gears 59a with gear means 74a on the circumference of the ring gear 66a and this moves the connecting parts 61a in an arc in a second direction and away from the shafts 51 and 52 whereby to change the length of the flexible connecting member 63a so that torque is transferred from the second shaft 52 to the first shaft 51 and thereby to rotate the first shaft 51 in the first direction.

As has been stated previously, the flexible connecting member or belt, 23 or 63, which is stretched by the arcuate movement of the pins on the planet gears is a key to the practice of this invention.

Various methods of making the flexible members or belts 23 and 63 such as are used in the apparatus of this invention are available to those practicing such invention. A number of such methods of making such belts are shown and described in U.S. patent application Serial No. 013,193 to Kutsch, filed Feb. 16, 1979 now U.S. Pat. No. 4,266,409. This application is hereby incorporated in this disclosure by reference.

Preferably this flexible belt, which plays such an important role in this invention, is preformed so as to conform to the particular configuration of the planet gears, and the location of the pins on such planet gears, being used in a given apparatus. By so doing, it is possible to reduce or eliminate the initial bending stresses which would be created by bending a relatively thick circular belt around relatively small diameter pins.

Basically the belt is made up of a plurality of sides, with the number of sides being determined by the number of pins being used. Thus for the configuration of FIGS. 1 and 2, the belt, which is trained around four (4) pins, has four (4) sides and is nominally square. The rounded curved corners of the belt are shaped to conform to the pin surface with which they are in contact. If desired, an elongated shoe may be placed over each pin better to distribute forces on the belt. When this is done the belt corners are made to conform to this shoe surface.

Preferably the belt is molded by well-known means employing laminating techniques into this generally polygonal-shape with semi-circular corners to fit the outside diameter of the bearings or pins. The belt is molded to a specific size so that when the pins are in their initial or at rest position, such belt is under an initial tensile preload. An oriented copolyetherester preferably is used to make the belt because of its chemical resistance, especially to hydrocarbon fluids, and its good stress-strain properties over a wide temperature range. Such belt has an initial installed elongation of about 5%. This provides a backlash free assembly that is easy to install and, for normal service temperatures does not creep significantly over normal service life.

Preferably the belt, as indicated previously, is molded from an oriented copolyetherester which is a polyester elastomer with good high and low temperature properties including flexibility, impact and creep resistance and good abrasion, flex-fatigue oil and solvent resistance.

The elastomeric belt is made of a polymer that consists essentially of a multiplicity of recurring long-chain and short-chain ester units joined head-to-tail through ester linkages, said long-chain ester units being represented by the structure:

and said short-chain ester units being represented by the structure:

wherein:
G is a divalent radical remaining after removal of terminal hydroxyl groups from poly(alkylene oxide) glycol having a number average molecular weight between about 400–6000, e.g., poly(tetramethylene oxide) glycol;
R is a divalent radical remaining after removal of carboxyl groups from a dicarboxylic acid having a molecular weight less than about 300, e.g, phthalic, terephthalic or isophthalic acids; and
D is a divalent radical remaining after removal of hydroxyl groups from a low molecular weight diol having a molecular weight less than about 250; said short-cut ester units constitute about 15–95% by weight of the copolyetherester and said long-chain ester units constitute the balance.

The copolyetheresters can be made conveniently by a conventional ester interchange reaction. A preferred procedure involves heating the dicarboxylic acid or ester thereof, e.g., dimethyl ester of terephthalic acid, phthalic or isophthalic acid, with a long-chain glycol, e.g., poly(tetramethylene oxide) glycol having a molecular weight of about 600–2000 and a molar excess of diol, e.g., 1,4-butanediol, in the presence of a catalyst at about 150°–260° C. and a pressure of 50–500 kPa, preferably ambient pressure, while distilling off methanol formed by the ester interchange. Thus, preferably, in the above formula G is the group remaining after removal of hydroxyl groups from poly(tetramethylene oxide) glycol having a number average molecular weight of about 600–2000; R is the group remaining after removal of carboxyl groups from phthalic, terephthalic or isophthalic acids or mixtures thereof, and D is the group remaining after removal of hydroxyl groups from 1,4-butanediol. At least 1.1 mole of diol should be present for each mole of acid, preferably at least about 1.25 mole of diol for each mole of acid. The long-chain glycol should be present in the amount of about 0.0025 to 0.85 mole per mole of dicarboxylic acid, preferably 0.01 to 0.6 mole per mole of acid.

Preferred copolyesters are those prepared from dimethyl terephthalate, 1,4-butanediol, and poly(tetramethylene oxide) glycol having a molecular weight of about 600–1500. Optionally, up to about 30 mole percent and preferably 5–20 mole percent of the dimethyl terephthalate in these polymers can be replaced by dimethyl phthalate or dimethyl isophthalate. Other preferred copolyesters are those prepared from dimethyl terephthalate, 1,4-butanediol, and poly(propylene oxide) glycol having a molecular weight of about 600–1600.

The copolyetherester compositions may also contain up to about 5 weight percent of an antioxidant, e.g., between about 0.2 and 5 weight percent, preferably between about 0.05 and 3 weight percent. The most preferred antioxidants are diaryl amines such as 4,4'-bis-(a,a-dimethylbenzyl) diphenylamine.

A composite belt of copolyetherester elastomer, wherein oriented elastomer is substantially encapsulated within unoriented elastomer, can be prepared by laying up the appropriate numer of layers of elastomer around a mandrel for an endless belt. The lay-up is heated to melt the lower melting point encapsulating elastomer without melting the higher melting point oriented core or encapsulated elastomer. The lay-up is cooled to solidify the lower melting point elastomer that bonds the layers together. External pressure can be applied to the plied-up stack during bonding to assure good melt flow and joining of the bonded layers.

Preferably the belt is formed by laminating by winding tape on a mandrel with the appropriate cross-section and heat bonding according to the aforementioned Kutsch application. For the apparatus of FIG. 11, we wrap the mandrel with 30 to 50 layers of 0.014 inch thick tape. The mandrel is shaped to provide the contour of generally straight sides linked by semi-circular curved corners suited to the bearings or pins over which the belt is installed. These "corners" eliminate to a large degree the bending stresses that occur in mechanisms where an endless belt of the standard form (i.e., molded on a circular mandrel), is bent over a small diameter pin or pulley putting the outside diameter in tension and the inside diameter in compression to the detriment of the integrity of the laminated structure. A "round" belt, however, would function mechanically in the apparatus of this invention but would not exhibit the same service life particularly where a thick belt is required. The mandrel is sized so that after manufacturing shrinkage the molded belt fits over the pins in the neutral or initial position with the desired initial elongation.

The oriented copolyetherester elastomer belt of this invention does not deteriorate and retains its elasticity and strength when immersed in transmission fluid at operating temperatures used in an automatic transmission system. The uniqueness of the oriented copolyetherester elastomeric belt lies in its exceptionally high stress development capability coupled with its potential for excellent recovery from high strains. This means that high forces can be developed with small cross-sections and that high extensions and, therefore, high degrees of rotation (for torque development and softer cushioning) can be achieved with minimal lengths of belt.

An elastomeric belt as described is preferred because its properties inherently permit low spring rates and internal damping; in many applications, however, metallic or nonmetallic compression springs may be employed in various configurations. One such is shown in FIG. 9. Other variations will occur to those skilled in the art.

A typical method of installing the flexible member or belt 63 in the apparatus 50 is an automatic transmission system involves a number of basic steps, which will be obvious to the user or to those skilled in the art. Each planet gear 59 is marked to indicate the high point of the eccentricity. The planet gears 59, without tires, are inserted inside the flexible member 63 by distorting the belt by flattening the structure somewhat so the belt may be positioned on or around the bearings 100 on pins 61 on such gears. The five (5) tires or rims 81 for the transmission end of the planet gears 59 are assembled by a shrink fit, having been previously heated to the required temperature. An expander preferably is employed which holds the five planet gears 59 in spaced planar array and controllably moves them radially. The expander tool is then inserted into the holes in planet gears 59 from the ends without the "tires" (the engine end) and such tool is expanded until the planet gears 59 are sufficiently apart to permit insertion onto the sun gear 51, which previously has been attached to the turbine assembly 77. It is necessary to align the previously marked high points and to this end as the planet gears 59 are placed about the sun gear, the individual planet gears are rotated to proper alignment, using a suitable spanner wrench. The expander tool is removed. The ring gear 66 is then installed with care being taken that proper spacing is employed which may be marked out in advance on the ring gear 66 and on each planet gear 59. Then the five (5) tires or races 81 for the "engine" side of the planet gears 59 are shrunk in place. The expander tool is inserted again and expanded enough to permit inserting the tire 80 on the engine side of the sun gear 55 which is held in place axially by a bushing on the shaft which is installed later. The turbine assembly is then installed on the transmission shaft 51. O-rings and spacer buttons and springs are installed followed by the pressure plate and drive lug which have previously been riveted together. The remaining assembly will be apparent to those skilled in the art.

This invention features an elastomeric belt for use in a lock-up clutch used in an automatic transmission system to replace the metal compression springs commonly used in such systems springs.

The belt of this invention is not a power transmission belt, nor does it function as a power transmission belt. The belt of this invention functions as a spring and it is used in a lock-up clutch in place of metal springs. Such belt must be capable of stretching during operation up to about 20% of the length of its perimeter and returning to substantially its same size; it is an energy-absorbing torque transmitter that is a cushioning device, it serves no power transmission functions in the sense that term is used in belt and pulley drives.

The belt or coupling of this invention generally is intended for resiliently transmitting torque from shaft to shaft where the shafts are aligned end-to-end. Slight parallel misalignments are accommodated in the fit of one gear to another and, where gears are splined to the shafts, at that fit as well. Only slight angular misalignment can be accommodated with the spur gears illustrated. In most practical applications, however, of the type mentioned previously there are only small errors in alignment which are well within practical tolerance of the embodiments of this invention just described.

OPERATION

The operation of the energy-absorbing belt of this invention can best be described by reference to FIGS. 1 and 2. FIG. 2 shows the apparatus at rest and when a clockwise torque is applied to the input shaft 12 and hence the hub 26, the pins 27 which are mounted on the hub 26 move with it. Thus relative motion takes place between the hub 26 and the shaft 11. This necessarily leads to arcuate motion of pins 21 and an extension of the elastomer belt 23 (see dotted lines in FIG. 2). This lengthening causes a corresponding restoring force in the elastomeric belt 23, which, in turn, is communicated to the output shaft 11. This force causes a clockwise torque in the driven or output shaft 11, which increases as the relative motion of the shaft 12 with respect to the shaft member 11 continues. The shaft 11 starts to turn when the torque caused by the stretching of elastomeric belt 23 becomes large enough to overcome the initial resisting torque in the output shaft 11. At first it turns more slowly than the input shaft 12 and the relative displacement continues to increase. The ensuing increasing torque causes the rotation of the output shaft 11 to speed up gradually until the torque supplied by the stretching elastomer belt 23 balances the torque caused by the load on the output shaft 11. At this point, the relative motion of the sun and planet gears, 15 and 19, ceases, and the shafts turn in unison. The two shafts are said to be locked together.

The reverse but entirely equivalent sequence of events takes place when driving power on the input shaft 12 is removed. Thus it is that this device permits smooth and gradual starting and stopping but avoids power loss due to slippage at the full rotation speed.

This belt acts similarly when transitory forces act on the machinery to which it is attached, as for instance, misfires, vibrations, or other sudden shocks. These are immediately compensated for by the relative motion of the input and output shafts and, in turn, by corresponding extension or contraction of the oriented elastomer belt 23 or 63. The elastic nature of such belts then permits a gradual shock-free return to the original condition, i.e., "locked" rotation of the input and output shafts.

A BEST MODE FOR CARRYING OUT THE INVENTION

A best mode for carrying out the invention may be practiced by referring to FIGS. 11 and 12, which shows a preferred apparatus of this invention, and by following the foregoing description.

INDUSTRIAL APPLICABILITY

Among the ways this invention is capable of exploitation in industry is that it gives to the art a method and apparatus heretofore not available to it, that being, an apparatus and method for transferring torque from one shaft to another in an improved and desirable manner.

We claim:

1. An apparatus including:
   a first rotatable member;
   at least two second rotatable members connected to said first rotatable member;
   each of said second rotatable members having a connecting part eccentrically mounted thereon;
   a third rotatable member connected to said second rotatable members;
   a flexible connecting member connecting said connecting parts together;
   drive means connected to said first rotatable member for rotating it in a first direction;
   whereby when said first rotatable member is rotated each of said connecting parts is moved in an arc in a second direction;
   whereby to change the length of said flexible connecting member so that torque is transferred from said first rotatable member to said third rotatable member; and
   thereby to rotate said third rotatable member in said first direction and wherein said connecting parts are curved pins and said flexible connecting member is a shaped, self-supporting belt having a plurality of substantially straight sides joined by curved corners which fit around said curved pins.

2. The apparatus of claim 1 wherein said third rotatable member is a hub.

3. The apparatus of claim 2 wherein said second rotatable members are pivotally connected to said hub.

4. The apparatus of claim 1 wherein said third rotatable member is a ring gear.

5. An apparatus including:
   a first rotatable member;
   at least two second rotatable members connected to said first rotatable member;
   each of said second rotatable members having a connecting part eccentrically mounted thereon;
   a third rotatable member connected to said second rotatable members;
   a flexible connecting member connecting said connecting parts together;
   drive means connected to said third rotatable member for rotating it in a first direction;
   whereby when said third rotatable member is rotated each of said connecting parts is moved in an arc in a second direction;
   whereby to change the length of said flexible connecting member so that torque is transferred from said third rotatable member to said first rotatable member; and
   thereby to rotate said first rotatable member in said first direction and wherein said connecting parts are curved pins and said flexible connecting member is a shaped, self-supporting belt having a plurality of substantially straight sides joined by curved corners which fit around said curved pins.

6. The apparatus of claim 5 wherein said third rotatable member is a hub.

7. The apparatus of claim 6 wherein said second rotatable members are pivotally connected to said hub.

8. The apparatus of claim 5 wherein said third rotatable member is a ring gear.

9. An apparatus including:
   a rotatable sun gear;
   at least two rotatable planet gears operatively connected to said sun gear through meshing teeth;
   each of said planet gears having a pin eccentrically mounted on a surface thereof and extending outwardly from said surface;
   a rotatable hub;
   said planet gears being pivotally connected to said hub;
   a flexible belt trained about and connecting said pins together;
   drive means connected to said hub for rotating it in a first direction;
   whereby when said hub is rotated each of said pins is moved in an arc in a second direction;
   whereby to change the length of said flexible belt so that torque is transferred from said hub to said sun gear; and,
   thereby to rotate said sun gear in said first direction.

10. The apparatus of claim 9 wherein said hub is fixedly connected to a rotatable shaft.

11. The apparatus of claim 9 wherein said planet gears are operatively connected to a rotatable shaft.

12. The apparatus of claim 9 wherein there are four (4) planet gears.

13. The apparatus of claim 12 wherein each of said planet gears is pivotally connected to a pivot which is fixedly connected to said hub.

14. The apparatus of claim 9 in which said belt is trained about a bearing journaled about each of said pins.

15. An apparatus including:
a rotatable sun gear;
at least two rotatable planet gears connected to said sun gear through meshing teeth;
each of said planet gears having a pin eccentrically mounted on a surface thereof and extending outwardly from said surface;
a rotatable ring gear connected to said planet gears through meshing teeth;
a flexible belt trained about and connecting said pins together;
drive means connected to said ring gear for rotating it in a first direction;
whereby when said ring gear is rotated each of said pins is moved in an arc in a second direction;
whereby to change the length of said flexible belt so that torque is transferred from said ring gear to said sun gear; and,
thereby to rotate said sun gear in said first direction.

16. The apparatus of claim 15 wherein said ring gear is operatively connected to a rotatable engine shaft.

17. The apparatus of claim 15 wherein said sun gear is operatively connected to a rotatable transmission shaft.

18. The apparatus of claim 15 wherein there are an odd number of planet gears.

19. The apparatus of claim 15 wherein there are an even number of planet gears.

20. The apparatus of claim 15 wherein there are five (5) planet gears and said flexible belt has five (5) sides.

21. The apparatus of claim 15 wherein each of said planet gears has a center of rotation which is free-floating with respect to said sun gear.

22. The apparatus of claim 15 in which said belt is trained about a bearing journaled about each of said pins.

23. An apparatus for transmitting torque from one shaft to another comprising:
a first shaft having a centerline;
a second shaft having a centerline, said centerline being an extension of said centerline of said first shaft, said shafts being in end-to-end relationship;
a cover plate fixedly connected to said second shaft;
a pressure plate frictionably connected to said cover plate;
a ring gear operatively connected to said pressure plate;
a plurality of planet gears operatively connected to said ring gear and rotatable in a plane normal to said centerline of said shafts;
a plurality of connecting gears at least one of which is fixedly and eccentrically mounted on each of said planet gears, said connecting parts being spaced uniformly on the circumference of a circle also having ghe centerlines of said shafts as its centerline;
a flexible connecting member connecting said connecting parts together;
said first shaft having gear means on its circumference;
said planet gears each having gear means on its circumference operatively connected to said gear means on said first shaft;
drive means connected to said first shaft for rotating said first shaft and said gear means on its circumference in a first direction;
whereby when said first shaft is rotated in said first direction each of said planet gears is rotated in a second direction through the operative connection of said gear means on the circumference of said planet gears with said gear means on the circumference of said first shaft and;
thereby moving said connecting parts in an arc in a second direction away from said first shaft;
whereby to change the length of said flexible connecting member so that torque is transferred from said first shaft to said second shaft and
thereby to rotate said second shaft in said first direction and wherein said connecting parts are curved pins and said flexible connecting member is a shaped, self-supporting belt having a plurality of substantially straight sides joined by curved corners which fit around said curved pins.

24. An apparatus for transmitting torque from one shaft to another comprising:
a first shaft having a centerline,
a second shaft having a centerline, said centerline being an extension of said centerline of said first shaft, said shafts being in end-to-end relationship;
a cover plate fixedly connected to said second shaft;
a pressure plate frictionably connected to said cover plate;
a ring gear having inner gear means operatively connected to said pressure plate and having the centerlines of said shafts as its centerline;
a plurality of planet gears operatively connected to said ring gear and rotatable in a plane normal to said centerlines of said shafts;
a plurality of connecting parts at least one of which is fixedly and eccentrically mounted on each of said planet gears, said connecting members being spaced uniformly on the circumference of a circle also having the centerlines of said shafts as its centerline;
a flexible connecting member connecting said connecting parts together;
said first shaft having gear means on its circumference;
said planet gears each having gear means on its circumference operatively connected to said gear means on said first shaft;
drive means connected to said second shaft for rotating it in a first direction;
whereby when said second shaft is rotated in said first direction each of said planet gears is rotated and;
thereby moving said connecting parts in an arc in a second direction away from said first shaft;
whereby to change the length of said flexible connecting member so that torque is transferred from said second shaft to said first shaft and
thereby to rotate said first shaft in said first direction and wherein said connecting parts are curved pins and said flexible connecting member is a shaped, self-supporting belt having a plurality of substantially straight sides joined by curved corners which fit around said curved pins.

25. An automotive power train including a drive shaft, a transmission shaft and an improved coupling between the shafts, said coupling comprising a sun gear on one of said shafts, a plurality of planet gears meshing with said sun gear, an eccentric pin mounted directly on each planet gear and a length of a preformed, resilient, elastomeric belt trained about and connecting adjacent pins, said planet gears being operatively associated with the other shaft for rotation therewith.

* * * * *